(12) United States Patent
McCarthy et al.

(10) Patent No.: US 8,887,909 B2
(45) Date of Patent: Nov. 18, 2014

(54) PROTECTIVE ENCASING FOR A MOBILE COMPUTING DEVICE

(76) Inventors: Kevin McCarthy, Sammamish, WA (US); Justin H. Knight, Fenton, MI (US)

( * ) Notice: Subject to any disclaimer, the term of this patent is extended or adjusted under 35 U.S.C. 154(b) by 296 days.

(21) Appl. No.: 13/449,995

(22) Filed: Apr. 18, 2012

(65) Prior Publication Data

US 2013/0277084 A1 Oct. 24, 2013

(51) Int. Cl.
*B65D 85/38* (2006.01)

(52) U.S. Cl.
USPC ........................................ 206/320; 455/575.8

(58) Field of Classification Search
CPC .................. A45C 2011/002; A45C 2011/003; A45C 2013/025; A45C 13/02; G06F 1/1628; H04B 1/3888; H01H 9/0242
USPC ............. 206/320, 586; 455/575.8; 248/345.1, 248/309.1; 267/139
See application file for complete search history.

(56) References Cited

U.S. PATENT DOCUMENTS

| 5,360,108 | A  | * | 11/1994 | Alagia | 206/320 |
| 7,938,260 | B2 | * | 5/2011 | Lin | 206/320 |
| 2005/0139498 | A1 | * | 6/2005 | Goros | 206/320 |
| 2010/0300909 | A1 | * | 12/2010 | Hung | 206/320 |
| 2012/0031788 | A1 | * | 2/2012 | Mongan et al. | 206/320 |
| 2012/0273375 | A1 | * | 11/2012 | Rice | 206/320 |

* cited by examiner

*Primary Examiner* — David Fidei
(74) *Attorney, Agent, or Firm* — Mitchell Law PLLC; Matthew W. Mitchell (57) ABSTRACT

An encasing for a mobile device is disclosed. The encasing includes a front portion including a discontinuous surface area configured to receive a bottom surface of the mobile device, a back portion opposite the front portion, and side portions configured to convexly couple to side surfaces of the mobile device. The side portions include a side region comprising a moveable flap configured to rotate when inserting and removing the mobile device.

14 Claims, 15 Drawing Sheets

(Prior Art)
FIG. 1

(Prior Art)

PROTECTIVE ENCASING FOR A MOBILE COMPUTING DEVICE

TECHNICAL FIELD

This disclosure relates to protective encasing for computing devices, and more particularly to protective cover for tablet or flat panel computing devices.

BACKGROUND

The statements in this section merely provide background information related to the present disclosure and may not constitute prior art.

Mobile devices, such as tablet or notebook computers have recently become popular consumer and business devices. Mobile devices have form and functions convenient for carrying the electronic apparatus, and intended to be operated in varying environments. Typical form-and-function factors of mobile devices include slate-shaped with electronic touch keyboards, booklets having dual touchscreens, or convertible hardware implementations whereby a keyboard is hidden and moveable via hinge. The dimensions of the mobile device are generally rectangular and around 8-inches by 10-inches, although tablet dimensions may vary considerably among device types and models.

Mobile devices are typically configured for wireless communication and include multiple connectors provided on a side surface edge of the housing for power, input, and communication device connections. The mobile devices are commonly configured to connect to other computing devices through a cabled or a wireless means. In operation, stylus or finger inputs control the mobile device and perform information processing without using a keyboard or mouse.

Figure 1:
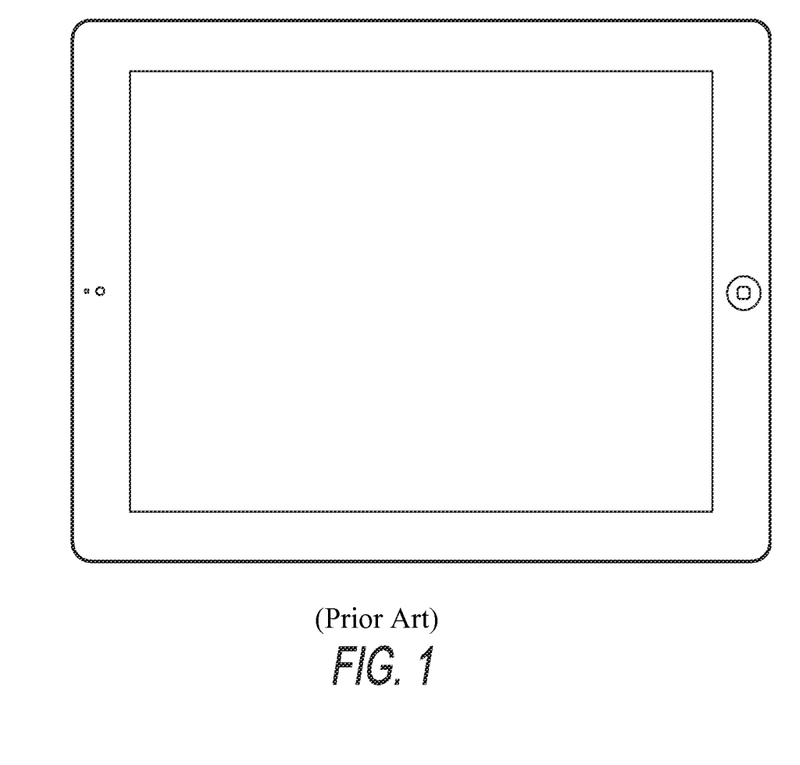
FIG. 1 shows an exemplary mobile device, in accordance with the prior art.
Figure 2:
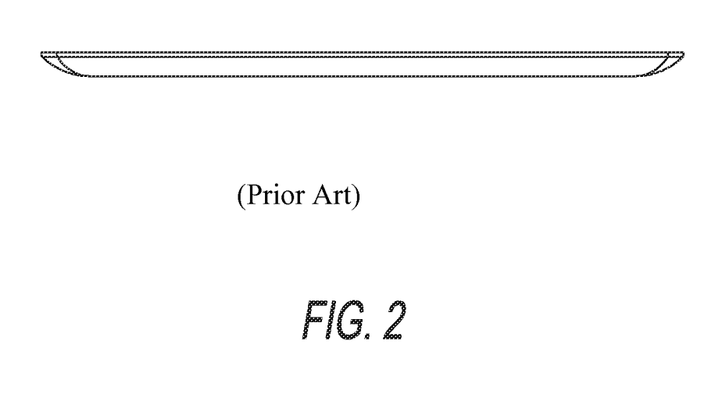
FIG. 2 is a side view of the exemplary mobile device, in accordance with the prior art.

FIG. 1 shows a top view of an exemplary, typical mobile device. FIG. 2 shows a side view of the mobile device depicted in FIG. 1. As FIGS. 1 and 2 show, typical mobile devices are self-contained electronic devices having a touchscreen for accepting user inputs by bringing a stylus, pen, or finger into contact with or close to the display screen to make the input position recognized. Resistive and capacitive technologies are commonly combined with liquid-crystal and light-emitting diode displays to detect user inputs over the display area. The touchscreen is typically disposed at the front of the housing and formed in a plate shape as a whole. For mobile devices configured to accept finger-based inputs, the touchscreen display commonly includes a polished glass overlay. Polished glass overlays are less susceptible to scratches than plastic polymer-based overlays, however, the glass overlays are sensitive to impact events.

To protect mobile devices, various cases and covers have been designed and offered. Many cases and covers ineffectively protect the mobile device by loosely holding the tablet in place, or by not providing a sufficient mechanical hold on to the device, risking the mobile device dislodging during a fall or impact event. Non-contiguous cases and covers having straps, buttons, threaded portions, tabs, and other connection means are cumbersome and inefficiently deployable in use. Known cases and covers are further disadvantaged by not enabling quick removal and insertion of mobile devices.

Therefore, there exists a need for a cover to encapsulate the mobile device and allow convenient accessibility of the mobile device.

SUMMARY

An encasing for a mobile device is disclosed. The encasing includes a front portion including a discontinuous surface area configured to receive a bottom surface of the mobile device, a back portion opposite the front portion, and side portions configured to convexly couple to side surfaces of the mobile device. The side portions include a side region comprising a moveable flap configured to both freely compress and to rotate when inserting and removing the mobile device.

Certain embodiments of the discontinuous surface area preferentially reduce friction and pressure forces to enable a mobile device user to more easily insert and remove the mobile device from the encasing.

Certain embodiments of the moveable flap are integrally formed of the encasing and configured to compress and bend permitting a user to securely encase the mobile device.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 3:
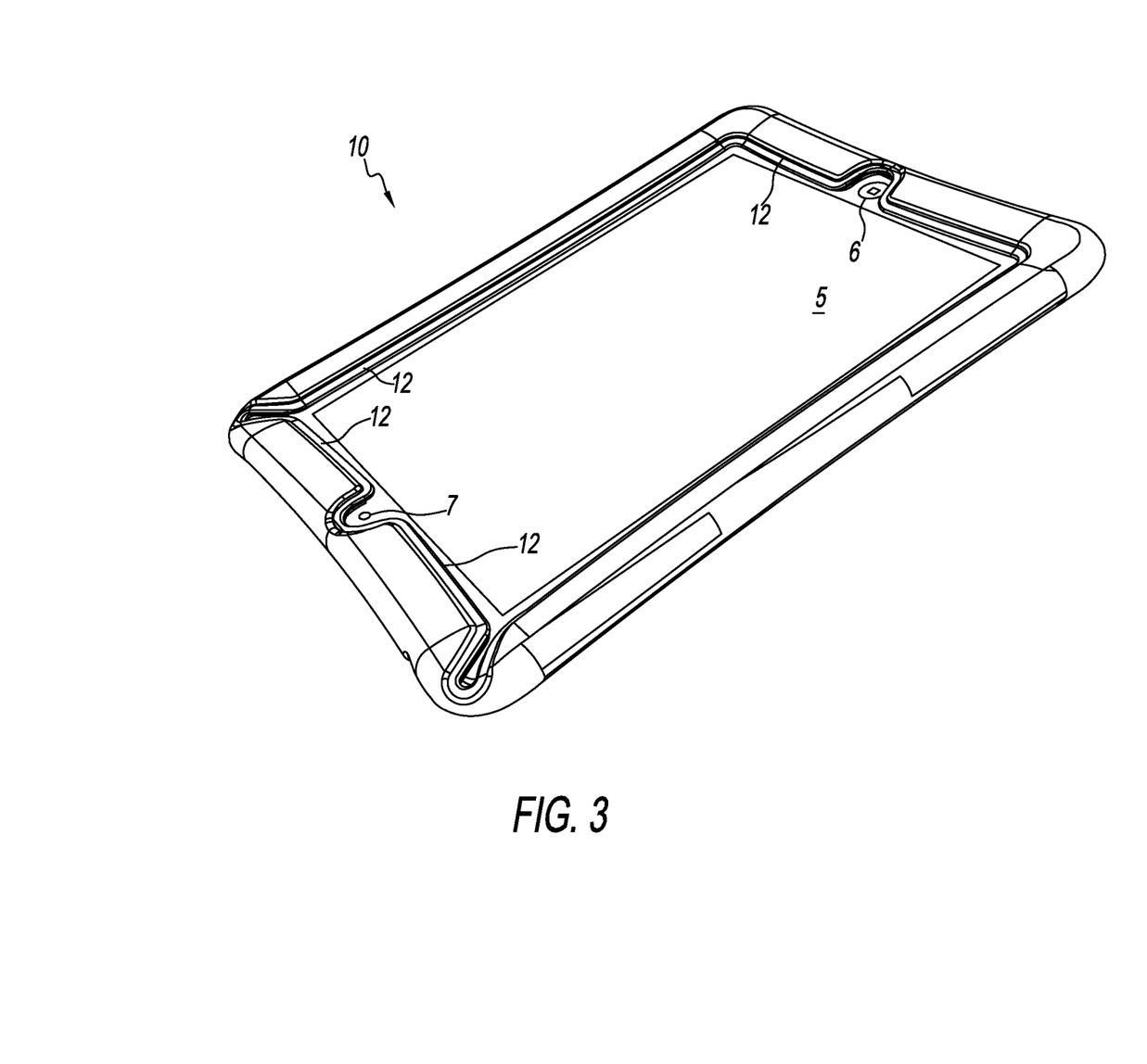
FIG. 3 is a perspective view of an exemplary mobile device cover sleeving or encasing an exemplary mobile device, in accordance with the present disclosure.
Figure 4A:
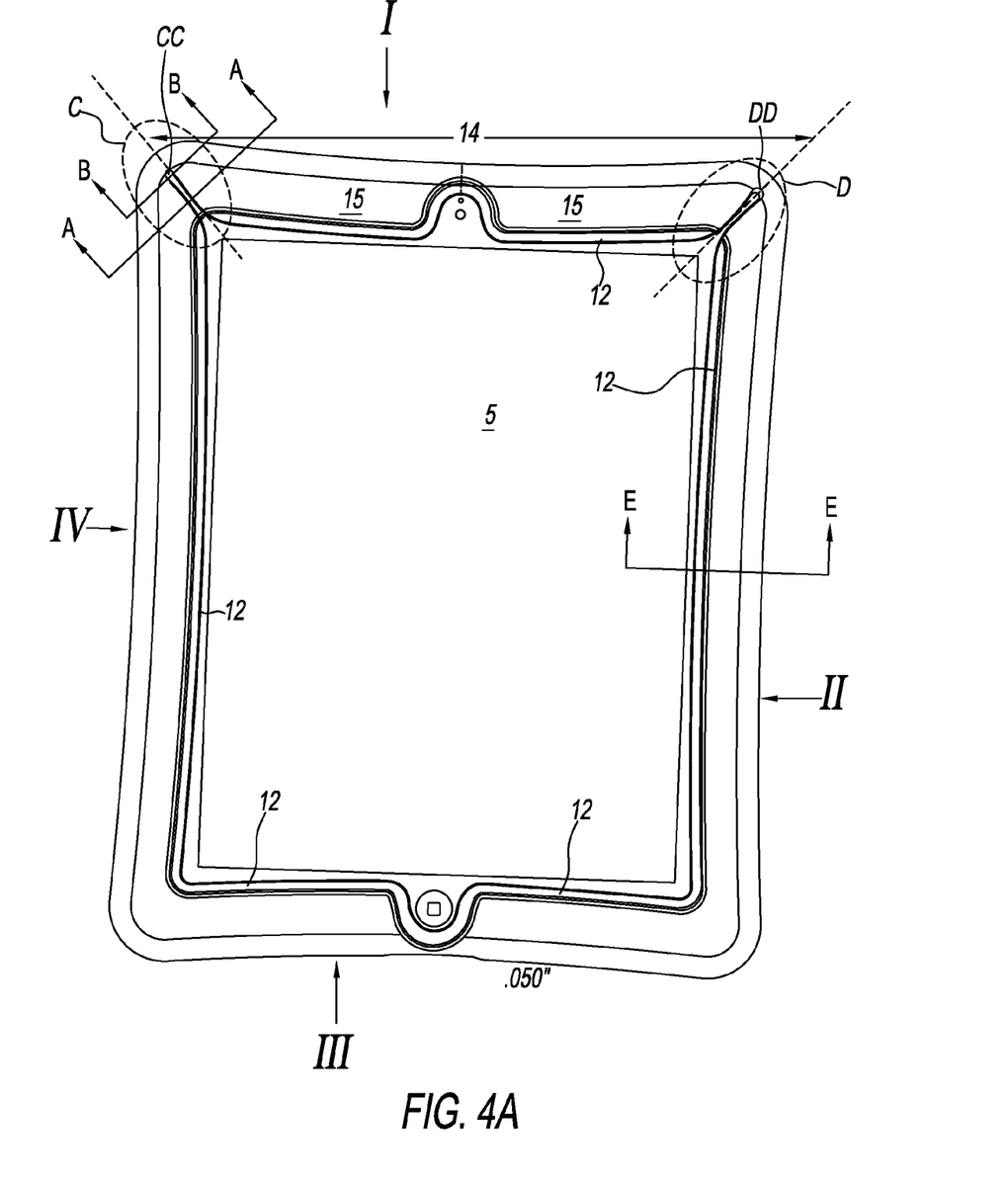
FIG. 4A is a top view of the exemplary mobile device cover encasing an exemplary mobile device, in accordance with the present disclosure.

Referring now to the drawings, wherein the depictions are for the purpose of illustrating certain exemplary embodiments only and not for the purpose of limiting the same, FIGS. 3 and 4 show an exemplary mobile device cover 10 enclosing an exemplary device 5. In an effort to promote clarity in the description of the mobile device cover 10 described herein, a mobile device will sometimes be illustrated and referenced. It should be appreciated that the mobile device is an exemplary mobile device and that the mobile device cover 10 may be adapted to other types of mobile devices consistent with the teachings herein. For example, the device 5 may be a cellular telephone, laptop computer, hand held scanner, tablet computer, Global Positioning System navigation devices, athletic monitoring devices, a music playing device, or any other devices that is substantially slate-shaped or cuboid-shaped having a thin or narrow side profile such as substantially shown in FIG. 2.

The cover 10 may be formed of any number of shock-absorbing materials including, e.g., molded plastic materials, thermoplastic or thermo-set elastomer, silicone-based materials, volcanized rubber blends, or foam-based materials including thermoset-based foams. As used herein, the term "elastomer" is used to refer to any type of flexible or elastic material that has the ability to stretch to moderate elongations and return to a shape close to its original shape and may refer to thermoplastic or thermoset elastomers. In many embodiments, the elastomer may be formed as a melt at elevated temperature. In general, elastomers may be a class of copolymers, which may be a mix of a plastic and a rubber, which consist of materials with both a thermoplastic and elastomeric properties. Thermoplastic elastomers may be processed by injection molding, compression molding, or cast molding.

Preferably, the cover 10 is formed of an elastic deformation material configured to preferably decelerate the device 5 and deflect impact forces during impact events away from the device 5. The deflection may absorb some impact energy in an elastic or plastic manner and may lessen the amount of energy transmitted to the device 5 enclosed by the cover 10. The deflection of the cover 10 may be a bending, flexing, contortion, or compression of the cover material, as a result of torsional or impact forces acting on elements of the cover 10. As described herein below, purposeful gaps between portions of the cover 10 and the device 5, functionally permit the device 5 to move in the direction away from forces while the cover 10 absorbs energy prior to contact with the device 5. Likewise, purposeful and strategic gaps between the cover 10 and the device 5 create a functional and protective suspension system causing a disconnect of energy force between the cover 10 and the device, thus serving to protect the device and disperse and decelerate impact loads. The deflection and/or deformation of the cover 10 may be designed to be within elastic strain regions for the cover 10. In such embodiments, the cover 10 may be able to absorb the same amount of impact energy repeatedly without degrading performance.

In addition to the deflection action, a cover 10 may operate by absorbing energy through compression of materials formed of the cover 10. Such embodiments may have foam or other materials that may absorb energy through compression. Contours of the cover 10 may have flexible properties that may flex when impacted. The flexing action may absorb some of the impact energy and protect the device 5 from damage. The flexing action may be bending, torsion, or combination of bending and torsion that may absorb impact energy.

As FIGS. 3 and 4A show, the cover 10 includes a lip 12 configured to press against the device 5 when encapsulated around a periphery. The lip 12 is preferably continuous, enabling the device 5 to be secured within the cover 10 by applying pressure on four sides of the device 5. The lip 12 is preferably adapted for a particular hardware application of a mobile device ensuring desirable force pressures against a top surface of the device 5. The lip 12 is integrally formed of the cover 10. Contours of the lip 12 are preferably adapted for control actuators and user input mechanisms such as a switch 6 and an imaging device 7 of the device 5. The lip 12 is contoured in a U-shape in region C and region D of the cover 10. The lip 12 includes a lip region 14 defined as a section of the lip 12 between a first vertex point or first saddle-point of the first U-shape shown as point CC and a second vertex point or second saddle-point of the second U-shape shown as point DD in FIG. 4A. The U-shaped contours permit the lip region 14 to function as a flexible, moveable and resilient flap 15 when an appropriate force is applied by a user. As described herein below, the flexible flap 15 is configured to either compress, or to rotationally bend and flex when applying an appropriate force and further configured to return to its static position upon release of the force.

Figure 4B:
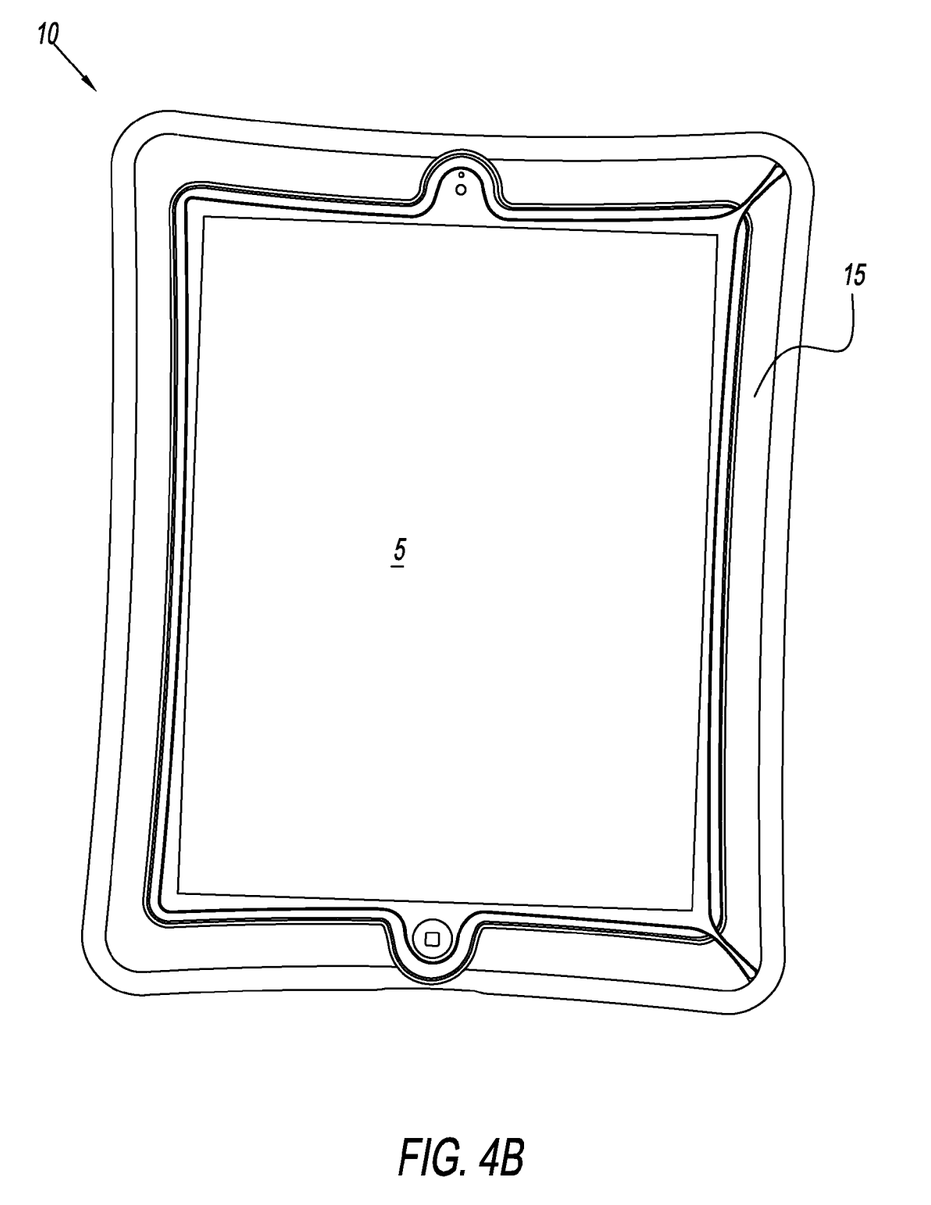
FIG. 4B is a top view of an embodiment of the exemplary mobile device cover encasing an exemplary mobile device, in accordance with the present disclosure.

FIG. 4B shows an exemplary embodiment of the encasing whereat the moveable flap 15 may be positioned on a longer side of a rectangular-shaped cover 10. As FIG. 4B shows, the U-shaped regions are positioned to form a disconnect or space between shorter lip regions of the cover 10 enabling a user to flip the moveable flap 15 when inserting or removing a mobile device.

Figure 5:
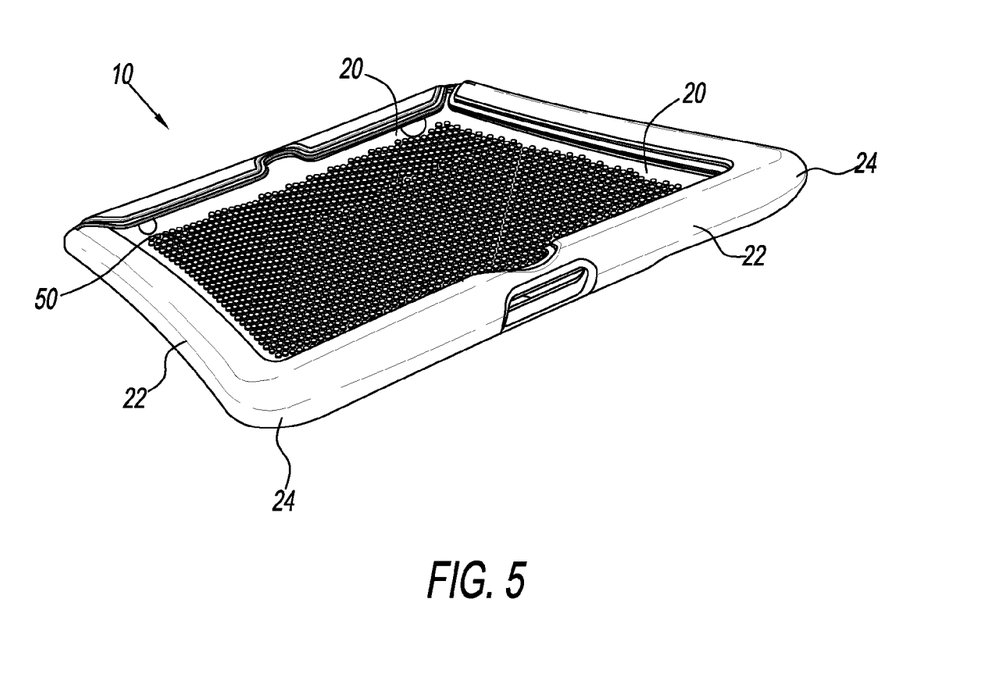
FIG. 5 is a perspective view of the exemplary mobile device cover without a sleeved or encased mobile device, in accordance with the present disclosure.

FIG. 5 shows the cover 10 with the device 5 removed. As FIG. 5 shows, the cover 10 includes an internal concavity region 20. The internal concavity region 20 is preferably adapted to receive a particular hardware adaptation of the device 5. In one embodiment the internal concavity region 20 is configured to have an air gap between an internal surface of the internal concavity region 20 and the device 5 when sleeved or encased. The air gap may allow the cover 10 to flex inwardly during an impact. The outer surface of the cover 10 is preferably convexly-shaped for ergonomic comfort to a user and to provide efficient protection of the device 5. Corners 24 of the cover 10 may be enlarged, in one embodiment, providing additional protection along the corners of the device 5, as these areas are more likely to be damaged during a fall or impact event. As described in further detail herein below, the cover 10 includes an internal discontinuous surface 50 integrally formed of the cover 10 and configured to discontinuously contact a bottom or back surface of the device 5.

Figure 6:
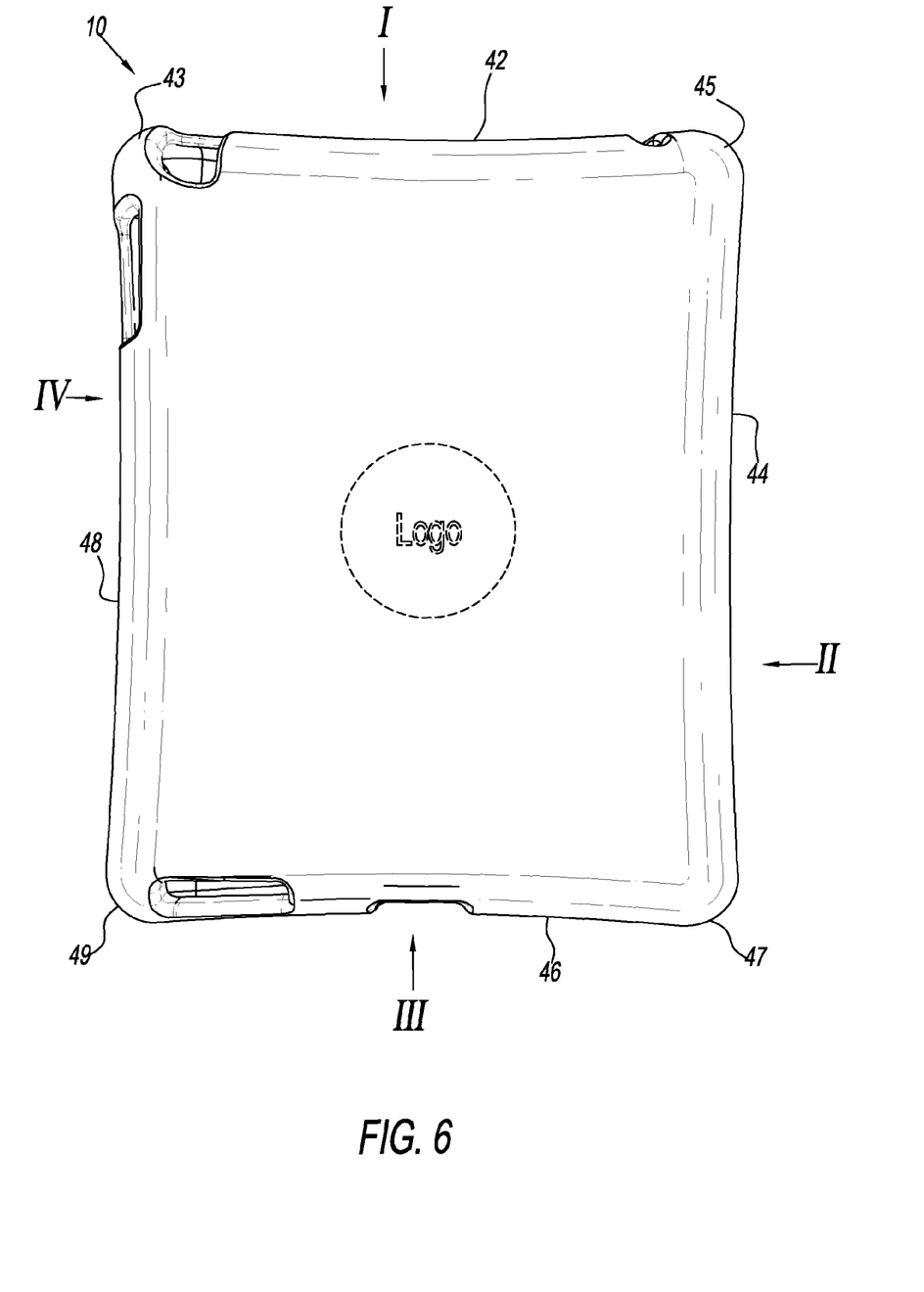
FIG. 6 is a bottom view of the exemplary mobile device cover, in accordance with the present disclosure.

FIG. 6 is a bottom view of the cover 10. As FIG. 6 shows, the cover 10 is a single contiguously formed body having sides 42, 44, 46, and 48 and convexly curved corner portions 43, 45, 47, and 49 merging substantially tangentially with the concavities of the sides 42, 44, 46, and 48. In one embodiment, concavity of the sides 42 and 46 in a non-compressed state are equal and concavity of the sides 44 and 48 in a non-compressed state are equal. In one embodiment, the convexity of the corner portions 43, 45, 47, and 49 are equal. A logo 52 may be integrally formed to a bottom surface 54. The bottom surface 54 is opposite the discontinuous surface 50 described herein above. Various apertures 32, 34, 36, 38, and 39 may be formed into the cover 10 as described herein below and illustrated in greater detail in FIGS. 7-10.

Figure 7:
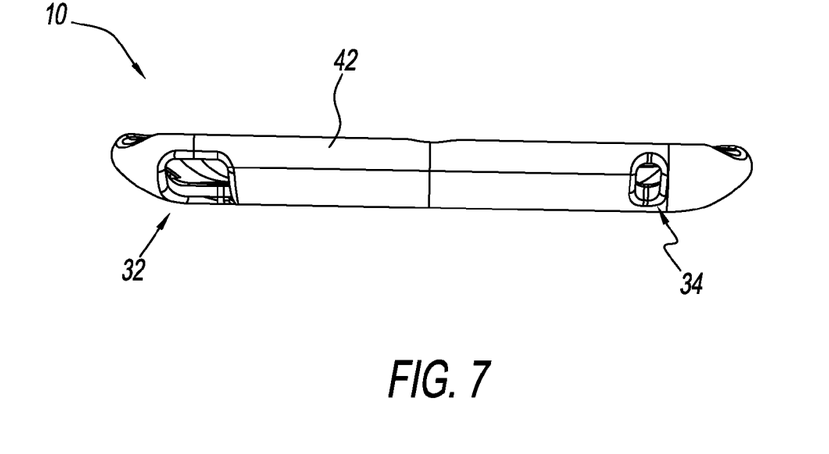
FIG. 7 is a side view of the exemplary mobile device cover corresponding to direction I of FIG. 4A, in accordance with the present disclosure.

FIG. 7 is a side view of the cover 10 corresponding to direction I of FIG. 4A and FIG. 6. As FIG. 7 shows, the cover 10 is formed to create apertures providing access to control functions of the device 5, communicatively link external devices, sound or thermal exhaust escape and/or imaging components. A first aperture 32 may, for example, provide access to control functions of the device. A second aperture 34 may, for example, provide access to a sound output connection.

Figure 8:
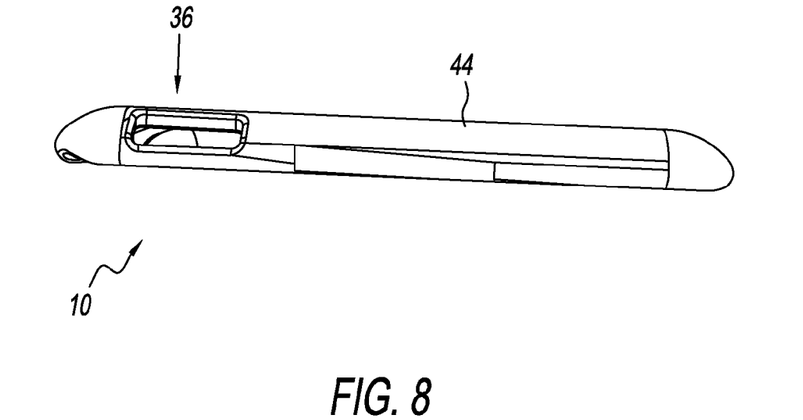
FIG. 8 is a side view of the exemplary mobile device cover corresponding to direction II of FIG. 4A, in accordance with the present disclosure.
Figure 9:
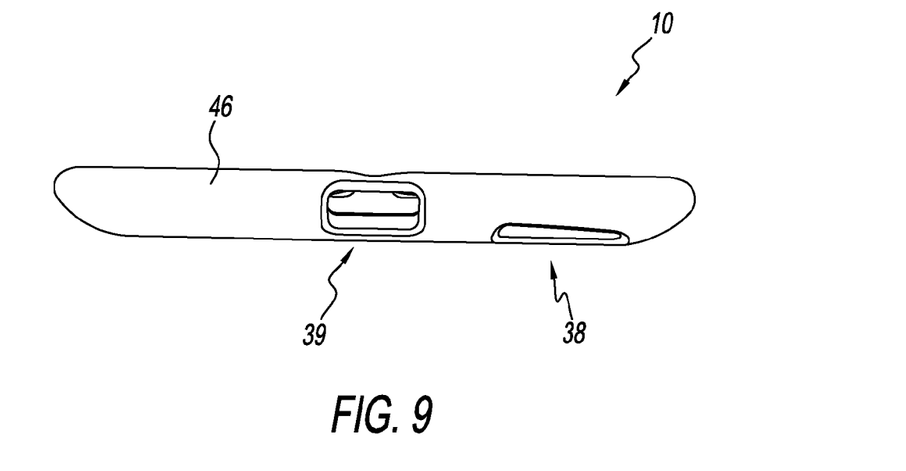
FIG. 9 is a side view of the exemplary mobile device cover corresponding to direction III of FIG. 4A, in accordance with the present disclosure.
Figure 10:
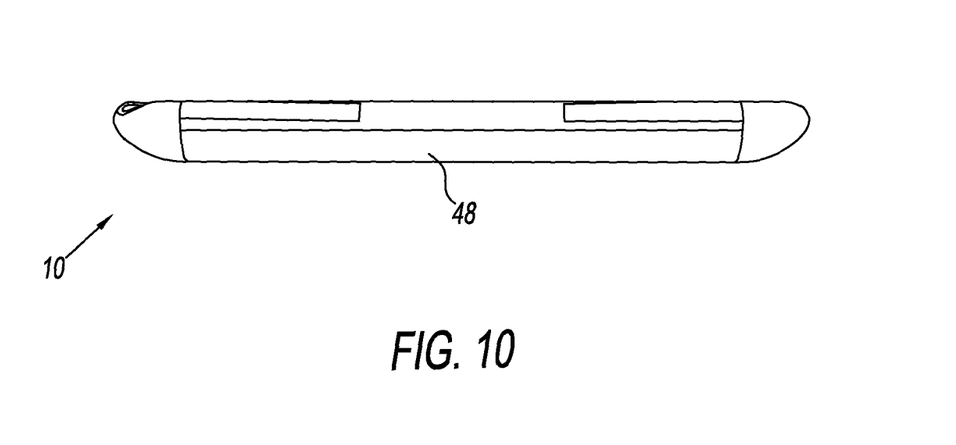
FIG. 10 is a side view of the exemplary mobile device cover corresponding to direction IV of FIG. 4A, in accordance with the present disclosure.

FIG. 8 is a side view of the cover 10 corresponding to direction II of FIG. 4A and FIG. 6 showing a third aperture 36. The third aperture 36 may, for example, provide access to control functions of the device 5 such as volume control and an ON/OFF operating state. FIG. 9 is a side view of the cover 10 corresponding to direction III of FIG. 4A and FIG. 6 showing a fourth and fifth aperture 38 and 39, respectively. The fourth aperture 38 may, for example, provide access to an electronic power source terminal to charge or power the device 5. The fifth aperture 39 may, for example, enable audio transmissions to exit the device 5 unencumbered by the cover 10. FIG. 10 is a side view of the cover 10 corresponding to direction IV of FIG. 4A and FIG. 6. FIG. 10 is an exemplary side view of an embodiment of the cover 10 having no apertures for access to or from the device 5. One skilled in the art will readily recognize that the apertures shown on the cover 10 in FIGS. 7-10 are exemplary. The disclosure herein can be applied to various aperture locations, shapes, and sizes, and can be applied to mobile device covers having any number of apertures.

Figure 11:
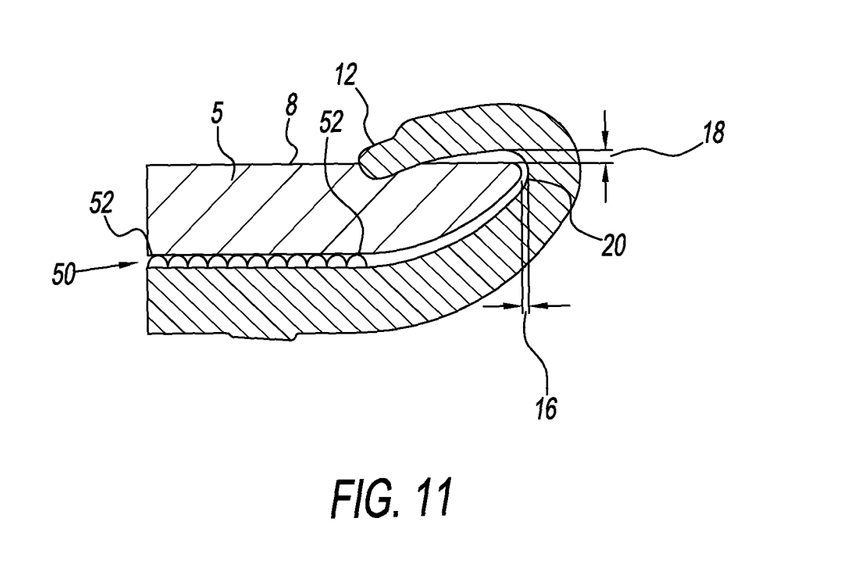
FIG. 11 is a cross-sectional view of the exemplary mobile device cover along line E-E as shown in FIG. 4A, in accordance with the present disclosure.

FIG. 11 is a cross-sectional view of the cover 10 along line E-E illustrating the cover 10 encapsulating the device 5. The extent distance or reaching length of flap 15 inwardly onto the top surface of the device 5, requires the said dividing contours of lip 12 throughout the region 14, particularly in said areas C and D. These dividing contours or slits, partially separate the flap 15 and enable independent movement of the flap 15. To enable entry of the device 5, said separated side of the flap flexes freely and independently from the remaining sides of the flap 15. In use, the lip 12 of the cover 10 contacts a top surface 8 of the device 5 substantially and mechanically such that the device cannot push through the lip 12 or flap 15, securing the device 5 to the cover 10. The extended distance or reach of flap 15 and the end of flap 15, the lip 12, over said glass front perimeter surface of the device 5 is such a distance that prevents the cover 10 from substantially yielding or releasing mechanical hold on to the device 5, thus retaining the device 5 upon any degree of load or impact. The limited elongation of cover 10, together with the extended distance reach of said flap 15 and lip 12, function to mechanically secure the device 5. The cover 10 is preferably adapted to contact the lip 12 to the device 5 using an interference fit whereby the lip 12 is configured to actively press against the device 5 as shown in FIG. 11. In many embodiments, the contact areas of the lip 12 may engage the device 5 and provide resistance of the device 5 from shifting during impact events. In these embodiments, the original geometry of lip 12 is located beyond the surface of the glass on the device 5 and is deflected under tension by the rigidity of the device 5. In certain embodiments of the cover 10, one or more contact areas of the lip 12 may be adapted to engage a mechanical feature on the device 5. The mechanical feature may be a recess, protrusion, or other shaped feature that may mechanically engage the device 5. As FIG. 11 shows, preferably the cover 10 is adapted to form a gap 16 between an edge of the device 5 and the internal concavity region 20. The gap 16 is preferential to aid in deflecting potential impact forces and to provide flexibility to a user when inserting the device 5. A top surface gap 18 may additionally be formed between the top surface 8 and the internal concavity region 20 to provide additional protection during impact events.

The cover 10 includes the discontinuous surface 50 integrally formed of the cover 10 and configured to discontinuously contact a bottom surface 6 of the device 5. The discontinuous surface 50 comprises a plurality of protrusions having contact surfaces 52. The contact surfaces 52 form space between surfaces of the device 5 and the cover 10 enabling ambient air flow between the bottom surface 6 of the device 5 and the cover 10 and dissipating thermal energy generated. Additionally, the discontinuous surface 50 of the cover 10 reduces frictional resistance when removing or inserting the device 5 within the cover 10. As FIG. 11 shows, the contact surfaces 52 may be round-shaped, i.e., semi-spherical, resembling a series of bumps.

Figure 12:
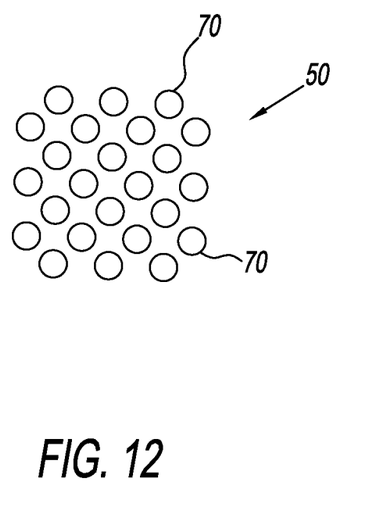
FIG. 12 is an exemplary pattern of bumps, in accordance with the present disclosure.

FIG. 12 shows an exemplary pattern of the plurality of protrusions 70 forming the discontinuous surface 50. As FIG. 12 shows, the discontinuous surface 50 may be textured with a plurality of rounded, i.e., semi-spherical protrusions 70. It is contemplated by this disclosure that the protrusions may be formed of any number of shapes configured to contact the bottom surface 6 of the device 5 including the semi-spheres as shown in FIG. 12. The contacting surfaces may be radially spaced from one another. In another embodiment, the discontinuous surface 50 may be formed of a plurality of dimples or depressions.

Figure 13:
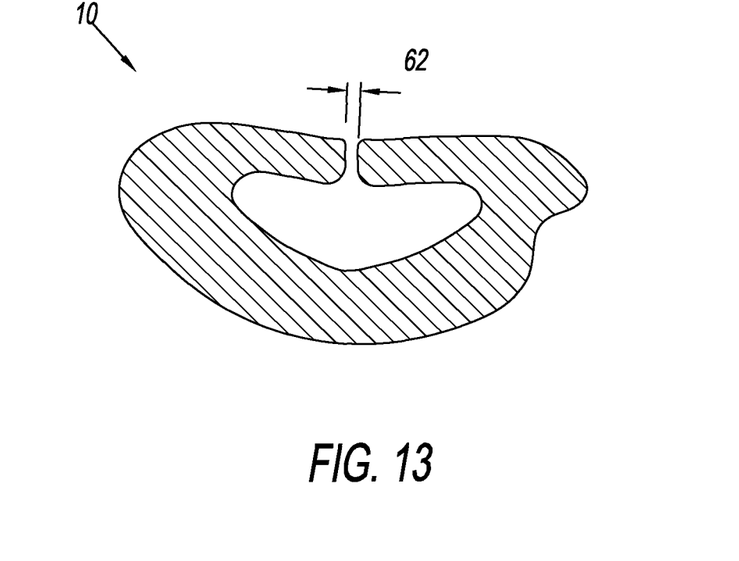
FIG. 13 is a cross-sectional view of the exemplary mobile device cover along line A-A as shown in FIG. 4A, in accordance with the present disclosure.
Figure 14:
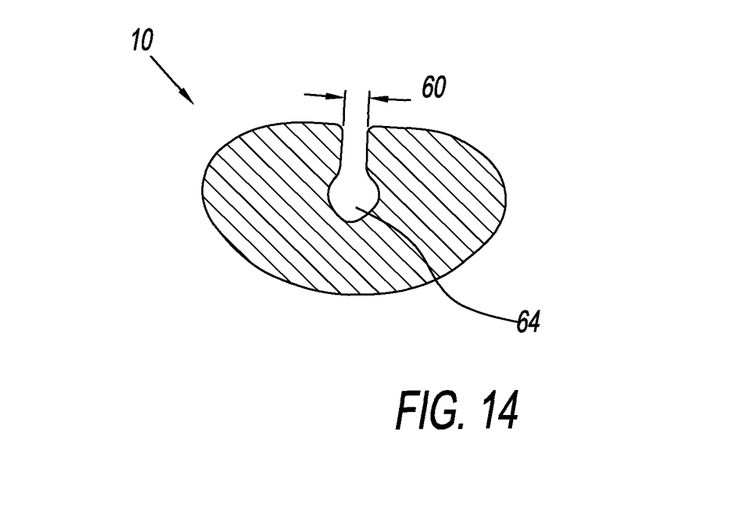
FIG. 14 is a cross-sectional view of the exemplary mobile device cover along line B-B as shown in FIG. 4A, in accordance with the present disclosure.

FIG. 13 is a cross-sectional view of the cover 10 along line A-A, and FIG. 14 is a cross-sectional view of the cover 10 along line B-B. FIGS. 13 and 14 illustrate a corner of the cover 10 having the U-shaped lip region 14 and flexible flap 15. As FIGS. 13 and 14 show the contoured U-shaped region preferably includes wider width 60 towards a corner of the cover 10 and a narrower width 62 within a middle portion of the U-shaped region. As FIG. 14 further shows, each of the corners may have an air gap 64. The air gap may give the cover 10 space to flex when subjected to an impact force. The gaps may be adapted for a particular hardware application of the device 5 enabling the cover 10 to deflect during impact events and absorb impact energy before contacting the device 5.

Figure 15:
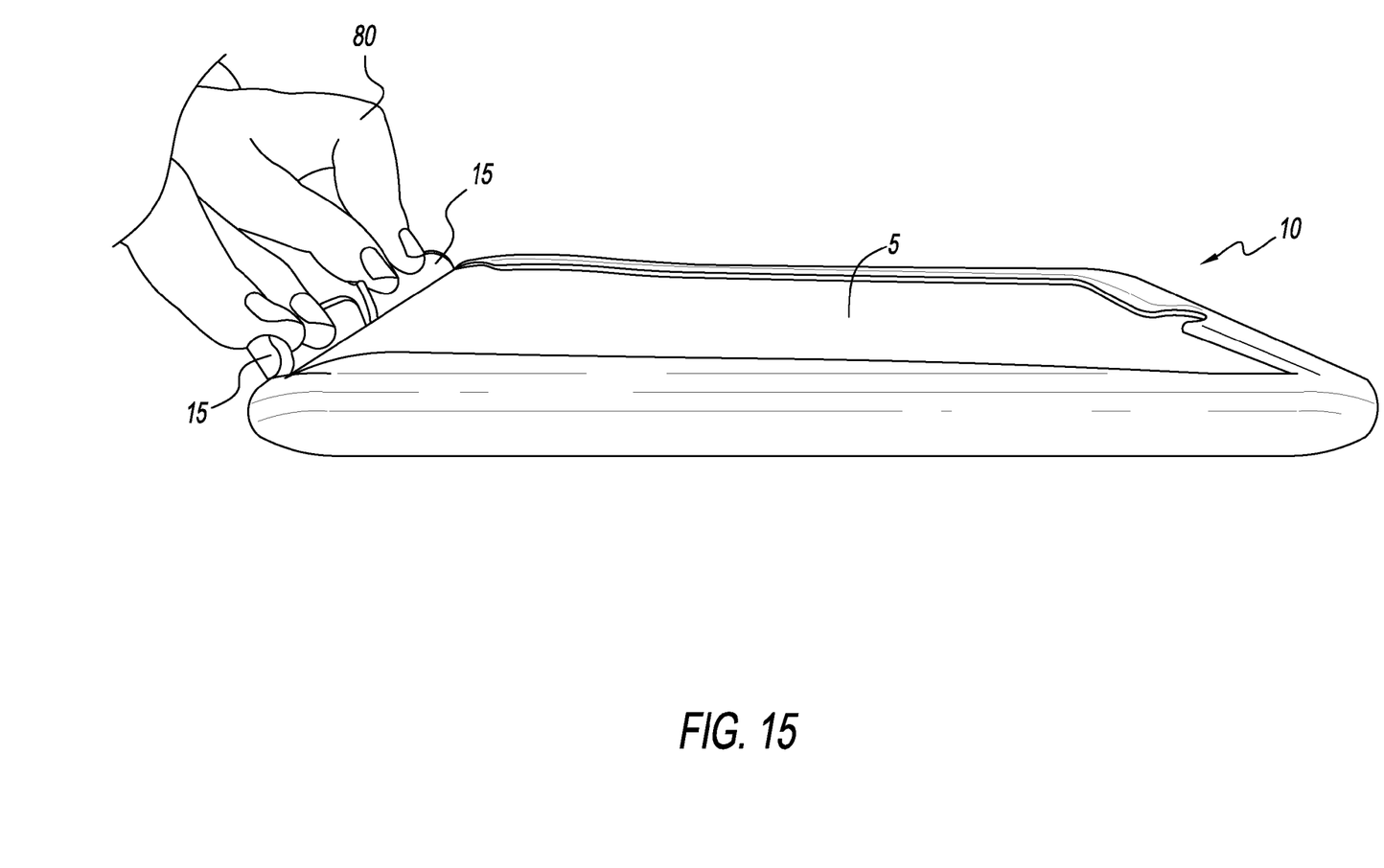
FIGS. 15-18 show removal and insertion of a device within the cover illustrating use of a flexible flap of the cover, in accordance with the present disclosure.
Figure 16:
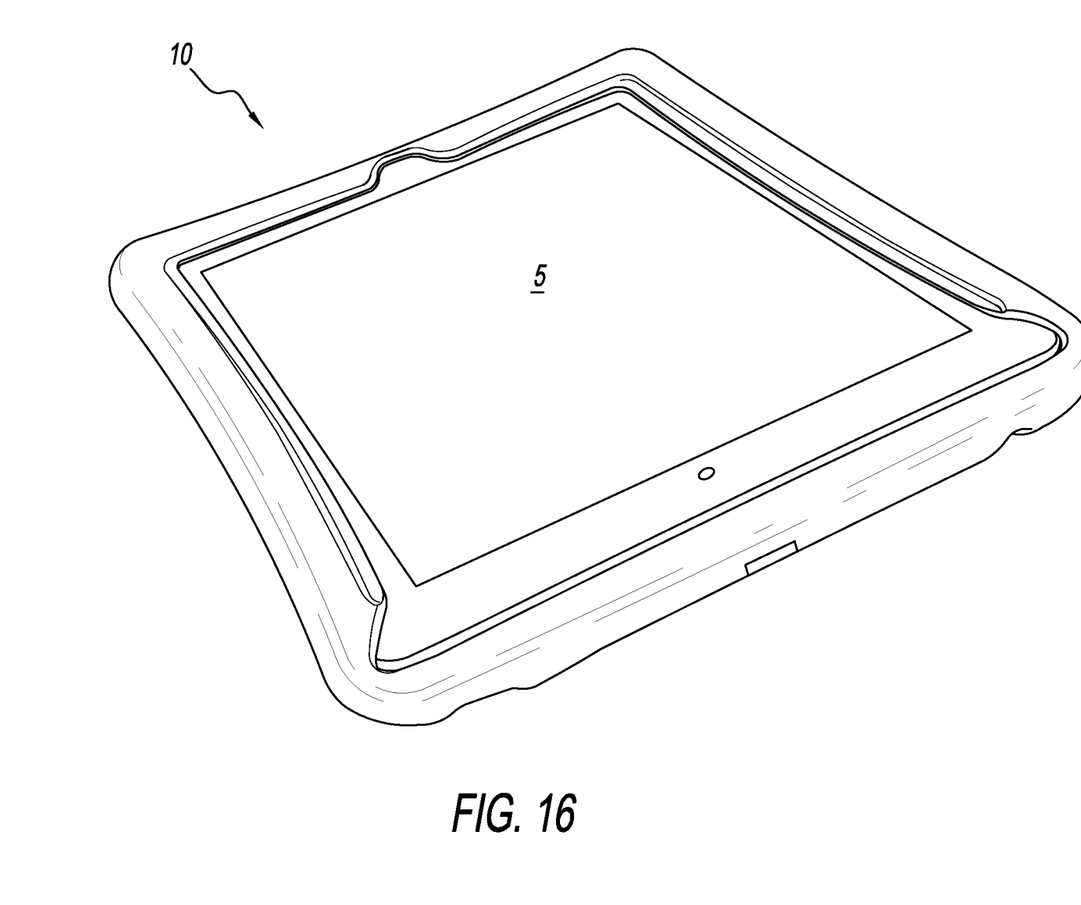
Figure 17:
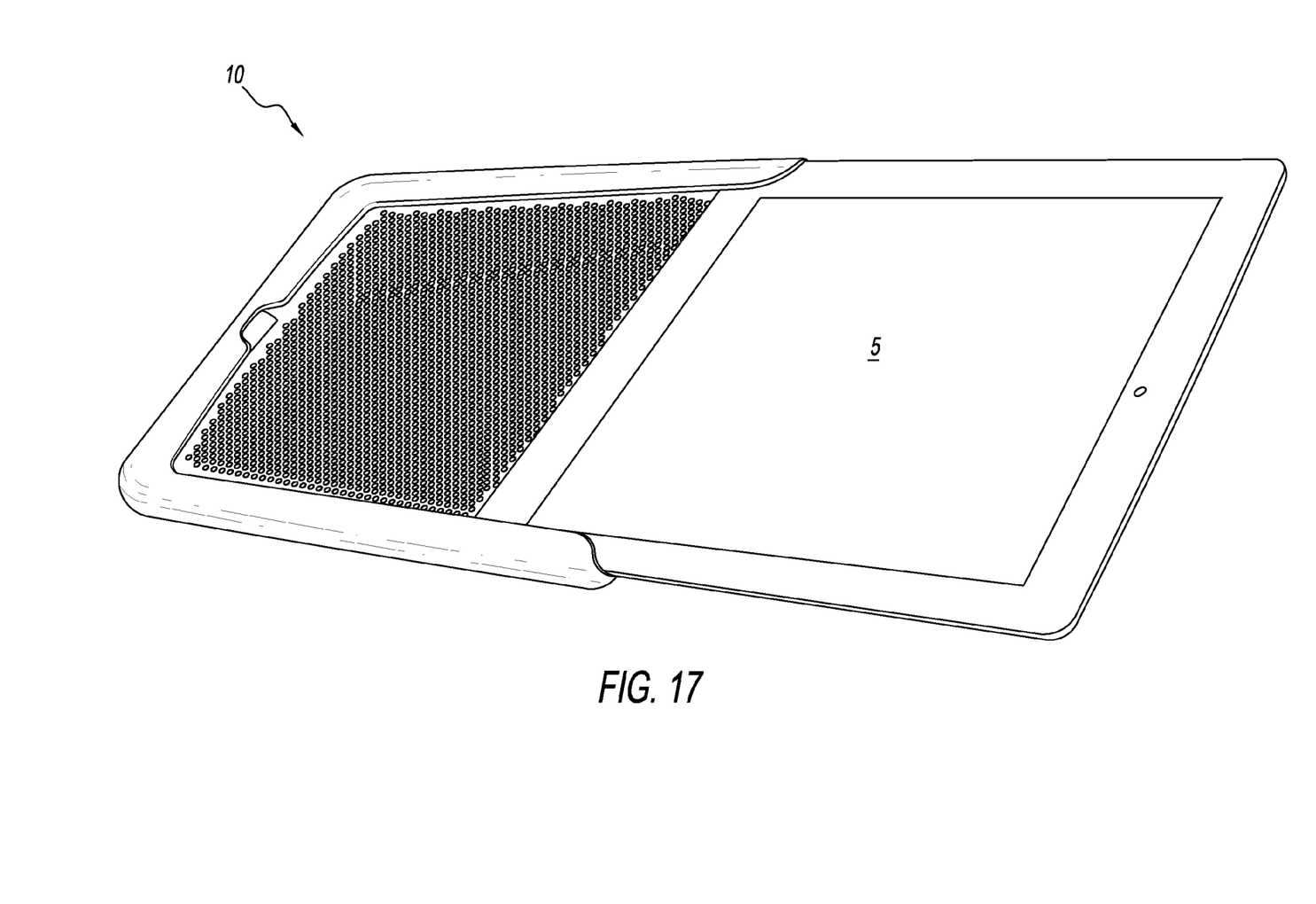
Figure 18:
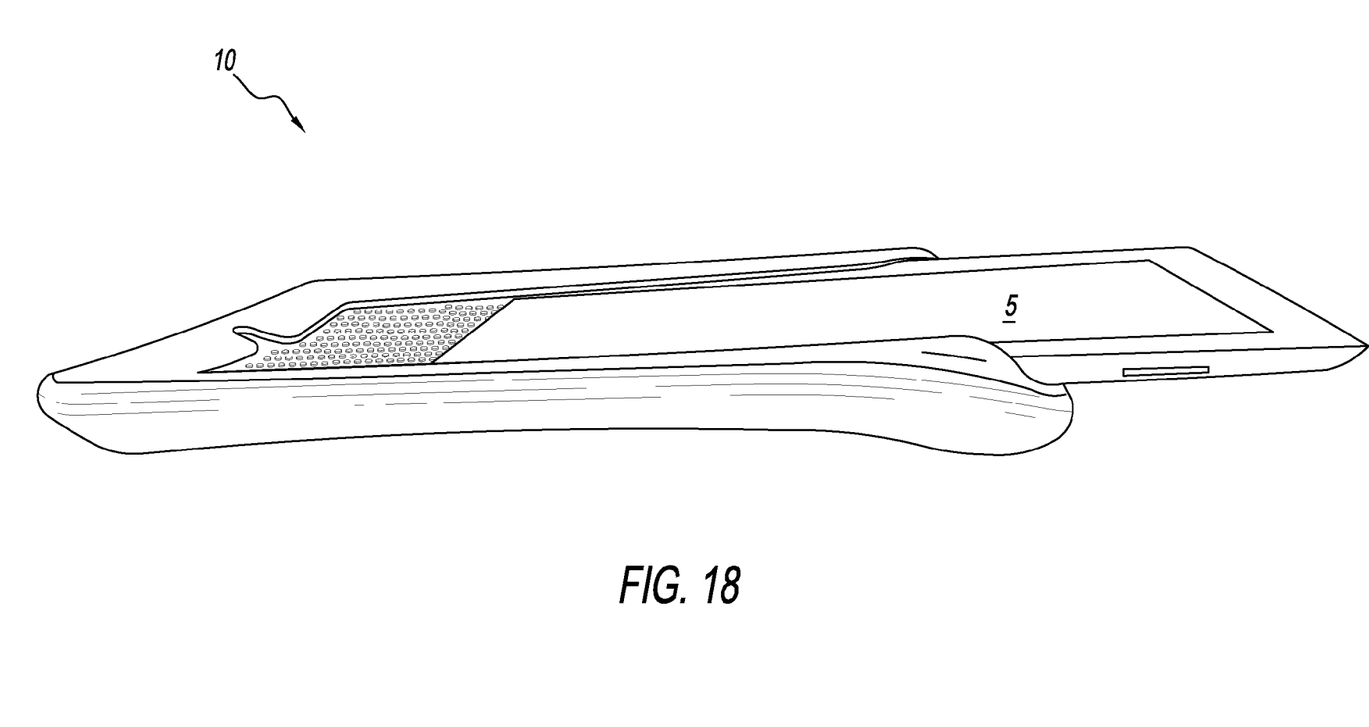

FIGS. 15-18 show insertion and removal of the device 5 from the cover 10 depicting flexing and bending of the flexible flap 15. FIG. 15 shows the pulling or peeling back of flap 15 at the opening end of the cover 10 to expose the end of the device 5. FIG. 16 shows the device 5 over the flap 15 during insertion or removal from the cover 10. As FIG. 16 shows, the device 5 fits into the U-shaped regions to position under the lips 12. FIG. 17 shows a second depiction of the device 5 during insertion or removal from the cover 10. As FIG. 17 shows, the device 5 is inserted and removed over the flap 15 and slides in and out of the cover 10 under the lips 12. FIG. 18 shows a side view of the cover 10 and the device 5 further illustrating insertion or removal of the device 5 from the cover 10.

During removal or insertion, a user applies a pulling force to the flexible flap 15 as shown in FIG. 15, transitioning the flexible flap 15 from a resting state to an extended state, and made able by the contours of lip 12 on flap 15 forming diagonal slits of about 45 degrees separating the continuous flap 15 at the corners, as described hereinabove. The flexible flap 15 then returns to a relaxed original position upon release.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An integrally formed encasing for a mobile device, comprising:
   a front portion including a discontinuous surface area configured to receive a bottom surface of the mobile device;
   a back portion opposite the front portion;
   side portions configured to convexly couple to side surfaces of the mobile device, the side portions comprising a lip configured to engage the mobile device and contoured in a first U-shape aligned with a first corner and contoured in a second U-shape aligned with a second corner; and
   wherein the side portions includes a side region comprising a moveable flap configured to rotate, the side region bound by a first vertex point associated with the first U-shape and a second vertex point associated with the second U-shape.

2. The integrally formed encasing of claim 1, wherein the side portions comprise convexly curved corner portions configured to merge substantially tangentially with the concavities of the side portions.

3. The integrally formed encasing of claim 1, further comprising:
   a plurality of apertures formed with the side portions and configured to provide access to the mobile device.

4. The integrally formed encasing of claim 1, wherein the discontinuous surface area comprises a plurality of protrusions.

5. The encasing of claim 1, wherein the encasing is molded from an elastomer material.

6. An integrally formed encasing for a mobile device, molded from an elastomer material, the encasing comprising:
   a front portion including a discontinuous surface area comprising a plurality of protrusions configured to form air gaps between a bottom surface of the mobile device and the discontinuous surface area when encasing the mobile device;
   a back portion opposite the front portion;
   side portions configured to convexly couple to side surfaces of the mobile device, the side portions comprising a lip configured to engage a top surface of the mobile device and contoured in a first U-shape aligned with a first corner and contoured in a second U-shape aligned with a second corner;
   wherein the side portions form an opening for exposing a display screen of the mobile device when the encasing is sleeved over the mobile device; and
   wherein the side portions includes a side region comprising a moveable flap configured to rotate, the side region bound by a first vertex point associated with the first U-shape and a second vertex point associated with the second U-shape.

7. The integrally formed encasing of claim 6, wherein the plurality of protrusions comprises semi-spheres integrally formed of the encasing.

8. The integrally formed encasing of claim 6, further comprising:
   a plurality of apertures formed with the side portions and configured to provide access to components of the mobile device.

9. The encasing of claim 6, wherein the first and second U-shaped disconnect the moveable flap from adjacent side portions and wherein the moveable flap is further configured to rotate independently of adjacent side portions due to the disconnect.

10. The encasing of claim 6, wherein the first corner and the second corner define a long side of a rectangular-shaped encasing.

11. The encasing of claim 6, wherein said front portion is relieved substantially to afford an open viewing screen of said device.

12. The encasing of claim 6, wherein the encasing is significant in periphery coverage to prevent the exit of the device through the front viewing opening.

13. The encasing of claim 12, wherein the encasing is greater than a distance measurement of 0.150" and less than a distance of 1.00" from the outer perimeter edge of the mobile device.

14. The encasing of claim 12, wherein the encasing comprises four corners, and wherein at least two adjacent corners of the front portion are partially separated.

\* \* \* \* \*